(12) United States Patent
Hamilton

(10) Patent No.: US 6,353,862 B1
(45) Date of Patent: Mar. 5, 2002

(54) VIDEO DEVICE MANAGER FOR MANAGING MOTION VIDEO OUTPUT DEVICES AND SUPPORTING CONTEXTS AND BUFFER ADOPTION

(75) Inventor: James Hamilton, Redwood City, CA (US)

(73) Assignee: Avid Technology, Inc., Tewksbury, MA (US)

(*) Notice: Subject to any disclaimer, the term of this patent is extended or adjusted under 35 U.S.C. 154(b) by 0 days.

(21) Appl. No.: 08/834,515

(22) Filed: Apr. 4, 1997

(51) Int. Cl.$^7$ ............................................... G06F 9/54
(52) U.S. Cl. ........................................ 709/323; 709/324
(58) Field of Search ............................... 709/100–108, 709/310–400

(56) References Cited

U.S. PATENT DOCUMENTS

| | | | | |
|---|---|---|---|---|
| 4,649,479 A | * | 3/1987 | Advani et al. | 709/1 |
| 4,742,450 A | * | 5/1988 | Duvall et al. | 709/300 |
| 5,349,656 A | | 9/1994 | Kaneko et al. | 395/650 |
| 5,455,958 A | * | 10/1995 | Flurry et al. | 710/65 |
| 5,459,857 A | * | 10/1995 | Ludlam et al. | 714/6 |
| 5,864,607 A | * | 1/1999 | Rosen et al. | 379/90.01 |
| 5,896,141 A | * | 4/1999 | Blaho et al. | 345/512 |

FOREIGN PATENT DOCUMENTS

EP   0 192 924 A2   9/1986
EP   0 442 717 A2   8/1991

OTHER PUBLICATIONS

"Resource Management System for Multimedia Devices" IBM Corp., Technical Disclosure Bulletin vol. 36 No. 09B Sep. 1993.*

"Method allowing unlimited users of a video hardware assist capability," IBM Technical Disclosure Bulletin, vol. 39, No. 3, Mar. 1996, p. 157.

"Resource Management System for Multimedia Devices," IBM Technical Disclosure Bulletin, vol. 36, No. 09B, Sep. 1993, pp. 525–529.

* cited by examiner

*Primary Examiner*—St. John Courtenay, III
*Assistant Examiner*—George Lawrence Opie
(74) *Attorney, Agent, or Firm*—Peter J. Gordon

(57) ABSTRACT

Sharing of resources of a device by an application is provided by a video device manager which defines contexts which are collections of logical entities, called a graph, which are used to produce a video composition and which are applied to a single collection of physical entities. One of these logical entities may be an input buffer or first-in first-out memory (FIFO). Another may be an output buffer or FIFO. Other entities may be defined for compression, decompression, video encoders and decoders, mixers and filters. Each entity also has memory locations to which it has access. An entity may adopt memory locations of another entity if the memory locations are accessible y the entity. Such buffer adoption reduces data copying by virtual devices.

7 Claims, 3 Drawing Sheets

VIDEO DEVICE MANAGER FOR MANAGING MOTION VIDEO OUTPUT DEVICES AND SUPPORTING CONTEXTS AND BUFFER ADOPTION

FIELD OF THE INVENTION

The present invention is related to a computer system which manages the use of video devices by an application program such as video editing system.

BACKGROUND OF THE INVENTION

Developments in computer technology have resulted in a proliferation of devices capable of processing motion video on a computer. It is generally desirable to provide a form of application programming interface (API) that abstracts low level details of the functions of video processing normally performed by such hardware devices from application programs which are used to develop motion video programs. Ideally, such an API should be both platform independent and device independent so that devices for many machines and platforms all implement the same API, which allows various applications to remain, albeit theoretically, unchanged for different platforms.

One form of video device manager providing such functionality is the "VDM" system from Avid Technology, Inc. of Tewksbury, Mass. Another kind of device manager is the ActiveMovie device manager from Microsoft Corporation, which has been extended by Matrox Corporation. Both implementations provide a form of virtual device for the variety of kinds of video processing devices which are used by application programs.

There are several problems to be solved by such device managers. One of these problems is that there may be separate virtual devices for performing compression, decompression, special effects or other processing, which generally implies that data produced by one device is copied to another virtual device in order for it to be used. However, video data copies require large amount of bandwidth and processing. It is desirable to eliminate any unnecessary copies between virtual devices. In addition, some activities to be performed by an application may require sharing of resources, such as a particular physical device. Such resource sharing should be provided in a straightforward yet robust manner.

SUMMARY OF THE INVENTION

Sharing of resources of a device by an application is provided by a video device manager which defines contexts which are collections of logical entities used to produce a video composition that are applied to a single collection of physical entities. One of the logical entities may be an input buffer or first-in first-out memory (FIFO). Another may be an output buffer or FIFO. Other logical entities may be defined for compressors, decompressors, video encoders and decoders, mixers and filters. A context is defined for each collection of logical devices that are connected to form what is called a graph. This collection is associated with a collection of connected physical resources.

For example, a graph may be used to define a blend of two compressed video streams using a first channel, defined by an input FIFO, a decompressor and an output FIFO, a second channel, defined by an input FIFO, decompressor and output FIFO, and a blender having two input FIFOs, a mixer and an output FIFO. If two physical decompressors are available then one graph, i.e. one context, is defined. With some physical devices, however, the decompressor used in the first channel may need to be the same chip used in the second channel. In order for the two virtual decompressor devices to share the same physical decompressor device, two contexts are used defining two separate graphs. In order to minimize data copying, input FIFOs are provided with a method for adopting memory locations from other virtual devices, particularly output FIFOs.

Each virtual device may be defined as a state machine. At any given time, a device will be in one of a set of states, such as idle, ready, armed, running and stopped. Only one virtual device per actual physical device may be active at a given time. This constraint is enforced by the use of contexts. When a particular virtual device leaves the idle state, all physical resources required for its use are allocated and locked to this device. By causing the state transitions applied to a device to be applied to all devices it connects to, i.e., all devices in its context, physical devices are shared among different contexts. Upon returning to the idle state, the physical resources are made available for use by other devices.

To implement buffer adoption, the input FIFO object has associated acceptable memory locations. An application may offer to the input FIFO memory locations for adoption where the memory locations are used by another virtual device such as an output FIFO. The input FIFO adoption method simply compares the offered memory locations with those that are considered acceptable. If these memory locations are acceptable, the input FIFO uses them and has a behavior as if a copy had occurred. If the memory locations are not acceptable, a physical copy operation is actually performed.

Accordingly, one aspect of the present invention is a video device manager for managing access to physical video processing devices on a computer by an application program executed on the computer. The video device manager defines a context for each collection of virtual devices that are applied to a collection of physical video processing devices. For an application program, the video device manager defines one or more virtual devices for allowing the application program to access one of the physical video processing devices, wherein each virtual device is defined as a state machine having an idle state and one or more active states. The video device manager ensures that only one context is currently active by causing state transitions applied to one device to be applied to all devices in its context.

Another aspect of the present invention is a video device manager for managing access to physical video processing devices on a computer by an application program executed on the computer. The video device manager defines, for an application program, one or more virtual devices for allowing the application program to access one of the physical video processing devices, wherein each virtual device has a corresponding set of associated memory locations. A virtual device can receive an indication of a memory location from other devices or an application program. The received memory location is compared with the memory locations associated with the virtual device. The data stored in the received memory location is used from the received memory location when the memory location is accessible by the physical video processing device associated with the virtual device. Otherwise, data is copied from the received memory location to the memory locations associated with the virtual device when the memory location is not accessible by the physical video processing device associated with the virtual device.

In one embodiment of the present invention, the video device manager ensures that only one virtual device is active in each context by allocating and locking the corresponding physical video processing device to the virtual device, when one of the virtual devices transitions from the idle state to an active state. When one of the virtual devices transitions to the idle state, the corresponding physical video processing device is deallocated and unlocked.

DETAILED DESCRIPTION

The present invention will be more completely understood through the following detailed description which should be read in conjunction with the attached drawing in which similar reference numbers indicate similar structures.

Figure 1:
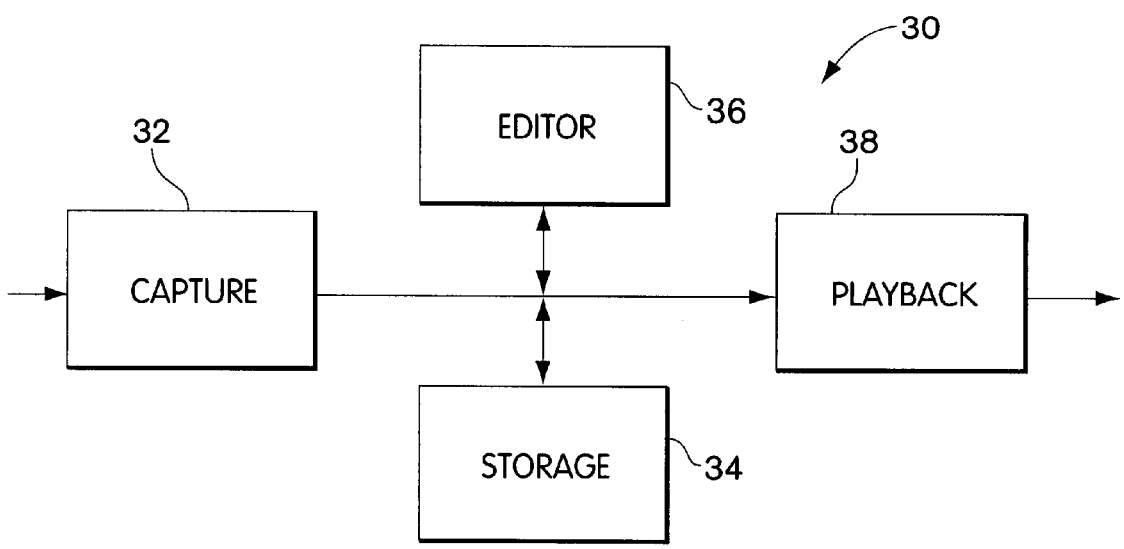
FIG. 1 is a block diagram of a typical digital nonlinear video editing system.

Referring now to FIG. 1, the primary components of a typical non-linear video editing system 30 are shown. The editing system includes a capture system 32 which receives video and/or audio information from an analog or digital source, converts the information to a desired format and stores the information in a storage system 34. Typically, the storage system stores data in data files accessible by other application programs through the file system of an operating system. For example, the capture system 32 may be an application program, or part of an application program, which writes incoming data into data files using operating system commands that access files in the file system. The storage system 34 is typically one or more computer-readable and writable disks. The editing system 30 also includes an editor 36. The editor typically manipulates a representation of a motion video program which includes references to files stored in storage 34 and ranges within those files defining the multimedia content to be included in the edited motion video program. A playback system 38 is also part of the editing system 30 and is used to playback the edited motion video program, as well as to display information from storage system 34 during the editing process. Accordingly, an editor 36 may also include playback system 38.

The system shown in FIG. 1 may be implemented on one computer, or on several computers. For example, a single standalone computer with application programs defining the functionality of the capture system 32, editor 36 and playback system 38 and having an appropriate storage system 34 can be provided. In addition, the capture system 32, editor 36, playback system 38 and storage system 34 may be separate machines that interact, for example, using a client/server protocol over a network 39.

Each of the elements of the system uses physical resources or devices for processing video. For example, the capture system may include a compressor; an editor may include a video display window; a playback system may include a decompressor. Each of these physical devices may have associated software called a device driver. These device drivers may be implemented to provide an application programming interface (API) that abstracts low level details of the functions of the video processing performed by the associated hardware device from the application programs which are used to develop the motion video programs. Such an abstraction can be provided by a video device manager such as the VDM system from Avid Technology, Inc. or the ActiveMovie device manager from Microsoft Corporation, which has been extended by Matrox Corporation.

Figure 2:
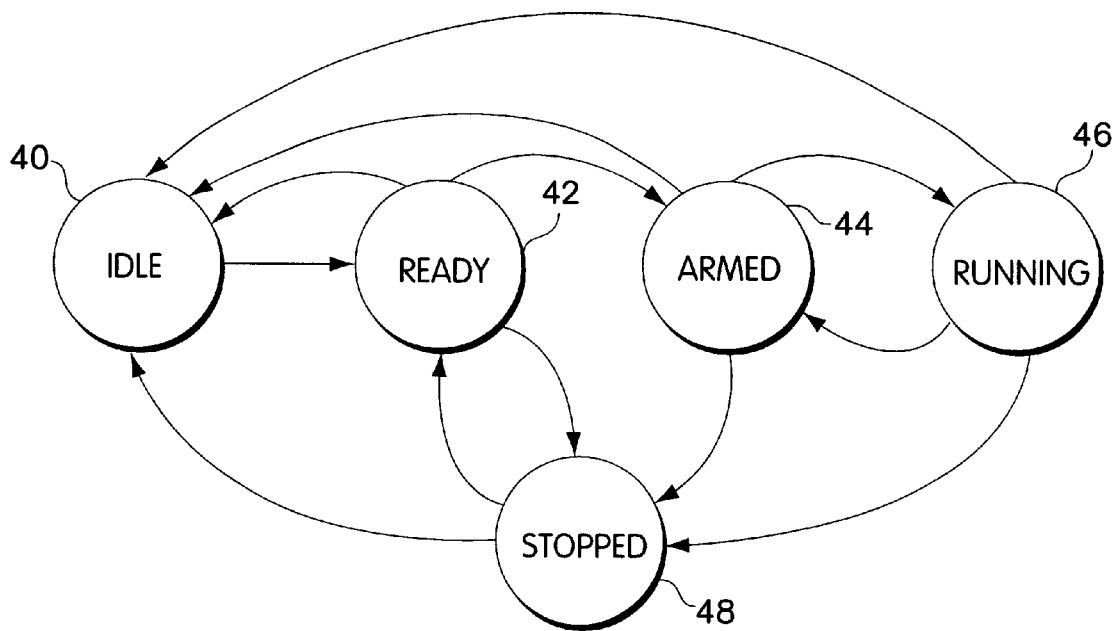
FIG. 2 is a state diagram representing a virtual device in one embodiment of the present invention.

The video device manager may support several kinds of devices, including decompressors, compressors, video encoders, video decoders, video windows, input FIFOs, output FIFOs, host buffers, two-dimensional digital video effects engines, three-dimensional digital video effects engines, blenders and filters, to name a few. In order to produce a video program, the definition of the composition is translated into a collection of virtual devices corresponding to the collection of physical devices to be used. This collection of virtual devices is called a graph Each graph defines a context as will be described below. Each device has a type and also may have a state as will now be described in connection with FIG. 2.

In one embodiment of the invention, a virtual device has five states. The first state is an idle state 40. A newly instantiated device should be in the idle state. Whenever the device is idle, its physical resources are available for use by other devices. The ready state 42 indicates that all physical resources required for the device are allocated and locked. Video content may be loaded and is retained by the device. The armed state 44 indicates that the device is ready to start playback in less than one frame time, at its standard video rate. This state also may represent a stalled state as described in U.S. Pat. No. 5,045,940 and PCT Publication WO94/24815. A running state 46 is used to indicate that the device is operating and processing video normally. In some devices, the ready state is equated with the armed state and the transition between the two is therefore automatic. A stopped state 48 is also provided, but may be omitted. When a device is stopped, it is no longer processing video. Generally, a device returns to the idle state 40 before restarting, but may be such that it returns to the ready state 42.

Figure 3:
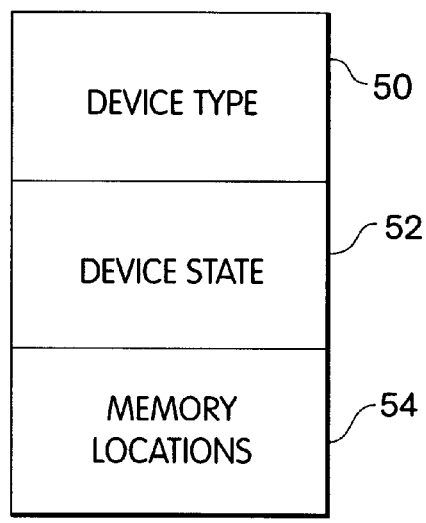
FIG. 3 is a diagram of a data structure for representing a device instance.

Referring now to FIG. 3, it may be desirable to implement the possible virtual devices in an object-oriented framework. In particular, a device may be defined as an object class, including a slot defining its type, as indicated at 50, and another slot indicating its state, as indicated at 52. The memory locations which may be read by the device are stored in slot 54. Each device also may have input and output ports through which it may be connected to other devices. Such connections may be static or may be dynamic and vary over time. Each device also may have controls, such as input for receiving an "alpha" value for compositing. Such controls may be static or may be dynamic and vary over time. The video device manager may manage these connections and controls in many ways, for example by maintaining in each device definition an indication of its connections and controls.

Several methods may be provided for each instance of a virtual device. These methods permit transitions between states and adoption of buffers, for example. A first set of methods may be used to query the state of a particular device. For example, a method for retrieving the state simply reads slot 52. Another method may be used to wait for the device to enter a specified state. One way to implement this method is to cause it not to return until the specified state is current, or until some specified timeout expires. This function may return 'TRUE' if the specified state was reached normally, and 'FALSE' if the timeout expired.

In order to implement the specified state transitions, other methods also are provided. It may be desirable to have all the state-changing methods return a 'TRUE' value if the state at the time of return is the desired state. No operation should be performed if the device already is in the target state at the time of the call to the specified method.

One of the methods is a prepare method which causes a transition from the idle state 40 to the ready state 42. This method should be valid only in the idle state and the ready state. By performing this method, the device should acquire and lock any physical resources needed for its use. If the resources are not available, it may raise an exception. Alternatively, it may queue itself for the resources and defer the state change until they become available. In addition to acquiring resources, the prepare method enables the loading of video data, e.g. compressed data, into a FIFO. Such data may not be loaded and is not retained in the idle state.

Another method is the arm method which causes a transition from the ready state 42 to the armed state 44. This method is only valid in the ready and armed states. Prior to a call to this method, the device may not process any frames. As soon as this method is called, frames may be processed. Generally, however, the video clock does not run, and no frames past the first are output from video encoders or decoders. Once the armed state is reached, it is possible to start video input or output within one frame-time.

A start method causes a transition from the armed state 44 to the running state 46, and is only valid in these two states. This method starts the video clock. The output of frames in a playback context is gated by the video clock, and prior to this method being called, no frames other than the first is output to a video encoder.

A pause method causes a transition back to the armed state 44 from the running state 46, and is only valid in these two states. This method suspends the output of video frames. Frame processing should stop as soon as feasible, consistent with reaching a consistent internal state from which processing can be restarted later.

A finish method causes a transition from the running state 46 to the stopped state 48 and is valid only in these two states. This method is called by the client program when the client has loaded all data that it intends to load. The method causes the device to enter the Stopped state as soon as it has processed all of its input. In the absence of this method, the processing pipeline of devices would eventually enter an underrun condition, if the video clock continued to run. Some hardware requires this knowledge in order to enable processing of the last frame or two of input. This function should return immediately.

An abort method may be used to transition from the ready, running or armed states to the stopped state. This method is similar to the finish method, except it stops processing immediately. For that reason it is also similar to the pause method except that it changes state to the stopped state instead of the armed state. This method is valid in any state except the idle state.

A terminate method is used to return the device from any state to the idle state, thereby relinquishing use of its physical resources, if any. This method may be called immediately after the finish or abort methods, without transitioning first to the stopped state. If called in the running or armed state without first calling the finish method, it may behave as though the abort method was called.

Although a state transition is initiated at only one device, the transition should in fact apply to all devices that are connected to it, recursively. In other words, making one device active causes all devices within its context to be active. While an application program using this interface may, in general, call the state change functions for all the devices it knows about, the video device manager should not depend on that. Accordingly, whenever a state-changing method is called, if the device is not already in that state then, in addition to changing state, the device should propagate the state change to any device to which it is connected on both its input ports and output ports. If there are any ordering constraints on starting the physical devices, these should be observed within this state-change propagation sequence.

In order to allow several of such virtual devices to share the same physical device, contexts are defined. The identification of available physical devices and the location of the device driver code for those devices that implement an appropriate API are platform and application dependent and within the skill of ordinary artisans in this field. Given the identification of such physical devices, a context is a list of references to instances of virtual devices associated with a corresponding set of particular physical devices, and a range of images in an output video sequence for which the virtual devices will use the physical devices. A context may be defined as an instance of a context object class. An application can cause a new context to be created at any time.

In order to keep track of the available types of devices and available contexts, a device registry is used which includes a list of all available types of devices, called an instantiator list, and a list of all available physical devices, called a context list. Contexts were described briefly above.

An instantiator is an object type used to define instances of each available device type in the system. Implementation of this object is straightforward given object definitions of the variety of types of devices and the physical characteristics and set up parameters of a given physical device.

Figure 4:
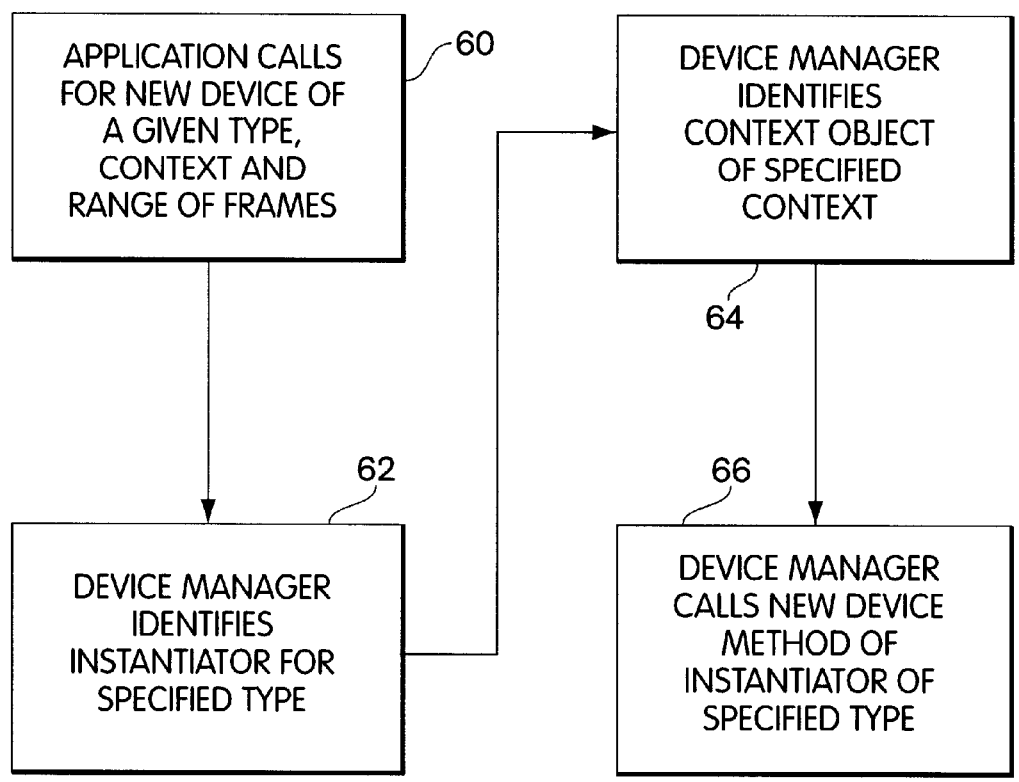
FIG. 4 is a flowchart describing how a new device is instantiated.

The creation of a new virtual device will now be described in connection with FIGS. 4 and 5. An application program typically requests the allocation of a new device based upon a composition being processed. In motion video systems, a composition is generally represented as a sequence of video segments, each having a media source and a range within that source. Each segment in turn may be arbitrarily complex. Each segment also has a place within the video program that can be defined by an absolute time range. The application calls a method of the device registry object which creates a new device, given a type of device, a context, and the absolute time range within the output video program for which the device will be used, as indicated in step 60 (FIG. 4). The device registry uses the received type to identify a device instantiator object for the indicated type in step 62. It uses the indicated context to identify a context object in step 64. The device registry then calls a method associated with the device instantiator of the indicated type for allocating the new device, given the device type, a reference to the context object for the context specified by the application, and the range of frames, in step 66.

Figure 5:
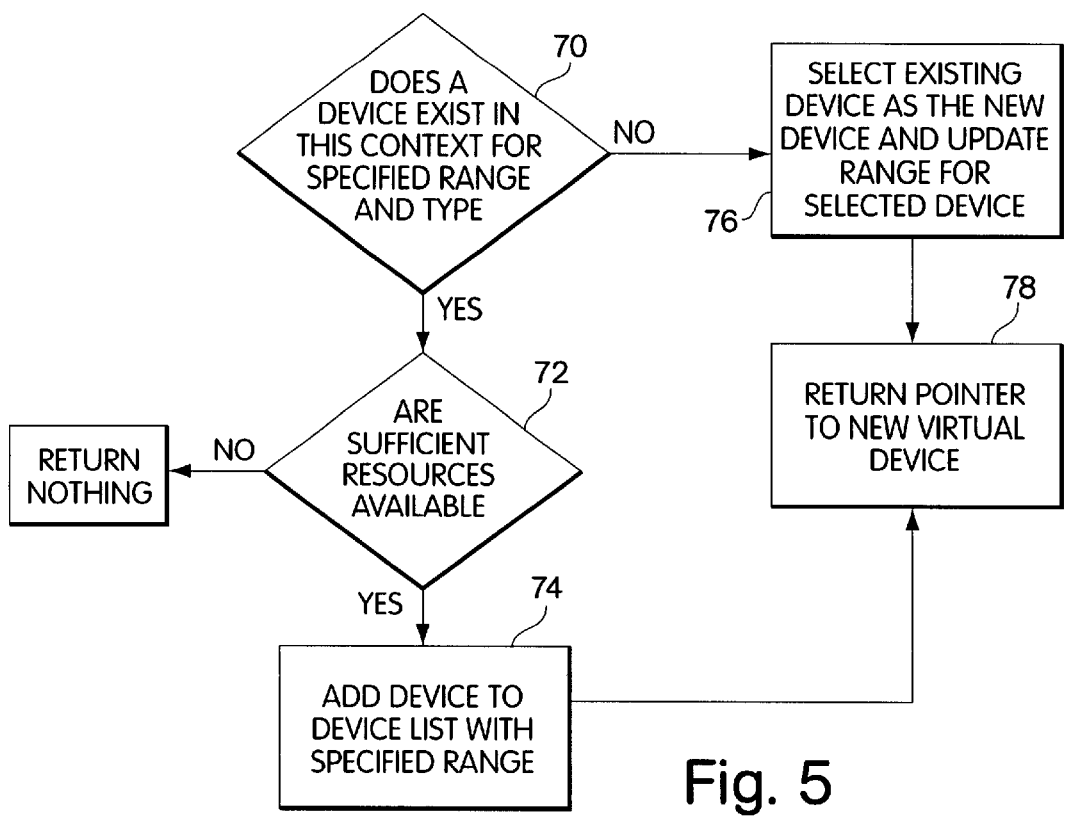
FIG. 5 is a flowchart describing how a device is added to a context.

Referring now to FIG. 5, the device instantiator method for creating a new virtual device within a context will now be described. First, it is determined whether a virtual device of the requested type already exists in the specified context for the specified range of output images, in step 70. If such a conflicting device exists, it is then determined in step 72 whether there are sufficient physical resources available to support a new virtual device in the same context of the same device type as the conflicting device. This step may be performed simply by counting the number of available physical devices of a given type and the number of virtual devices of the given type assigned to the specified range. If sufficient resources are available, a new device is allocated in step 74. Otherwise, no new device is returned. If there is no conflicting device, a device of the designated type is assigned the specified range of output images in step 76. The device may be a new device, if no devices of this type were previously created, or an existing device which is then assigned the specified range of output images in addition to its currently assigned range of output images. The pointer for the device is returned in step 78.

Since a context is defined for a collection of physical devices, and each virtual device in a context allocates these resources when one of the virtual devices in the context transitions from the idle to the ready state, conflicts in access to the physical resources by the different virtual devices in different contexts are prevented. By controlling how devices are added to a context in the manner shown in FIG. 5, the video device manager also can verify whether sufficient resources are available for processing a composition in any given context.

Figure 6:
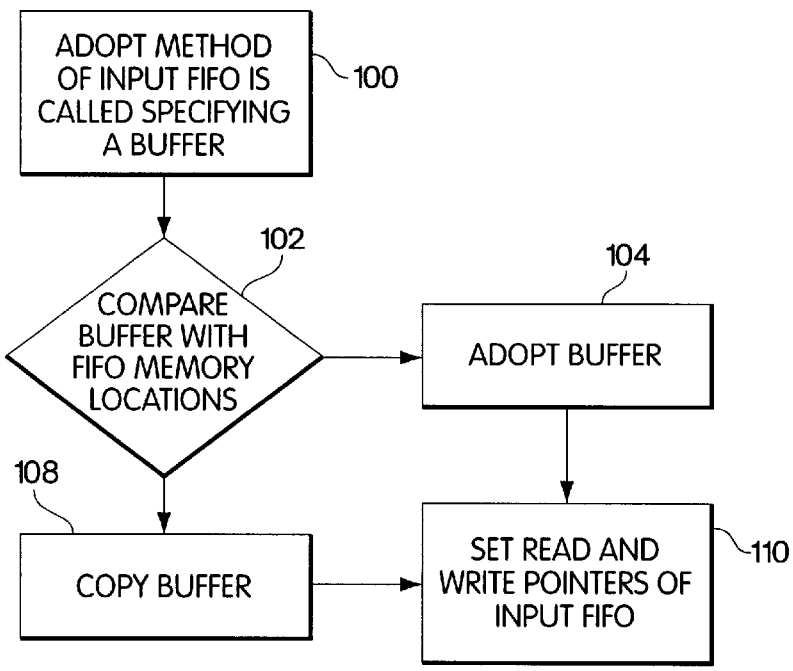
FIG. 6 is a flowchart describing how a buffer is adopted by an input FIFO in one embodiment of the present invention.

Referring now to FIG. 6, the process of buffer adoption will now be described. Buffers may be adopted by an input FIFO device, or other appropriate device if so defined, in response to a request from an application program or other program which calls the adopt method of the input FIFO object. Since the input FIFO object has a set of acceptable memory locations, the adopt method is called with an indication of a buffer to the input FIFO object. This indication may be provided by a memory start location and a length. This step of calling the adopt method of the input FIFO is shown in step 100. The indicated buffer is then compared to the acceptable memory locations of the input FIFO object (e.g., slot 54 in FIG. 3) in step 102. If the offered buffer is within the input FIFO's acceptable memory locations, then the input FIFO uses the indicated buffer as if a copy actually had occurred, as indicated at 104. Otherwise, the input FIFO copies the data in the offered buffer into one of its acceptable memory locations in step 108. In either case, the input FIFO may then set its read pointer to the beginning of the buffer and its write pointer to the end of the buffer as indicated in step 110. These read and write pointers may be separate slots of the input FIFO object.

By providing an adopt method for an input FIFO as described, unnecessary copying between virtual devices can be eliminated. This is particularly useful where the output of a physical device is reused by the same device, typically, but not necessarily under control of different virtual devices, or in some cases where a device may act as a bus master. By using the contexts and buffer adoption as described above, the present invention enhances the ability of applications to share physical resources in a video editing system.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalent thereto.

What is claimed is:

1. A video device manager for managing access to physical video processing devices on a computer by an application program executed on the computer, comprising:

means for defining a plurality of contexts, wherein a context is defined as a collection of the physical video processing devices;

means for defining, for an application program, one or more virtual devices for allowing the application program to access one of the physical video processing devices, wherein each virtual device is defined, within one of the plurality of contexts, as a state machine having an idle state and one or more active states; and means for ensuring that virtual devices of only one context are in the active state.

2. The video device manager of claim 1, wherein the means for ensuring that virtual devices of only one context are active includes means, operative when one of the virtual devices transitions from the idle state to an active state, for allocating and locking the corresponding physical video processing device to the virtual device.

3. The video device manager of claim 1, wherein the means for ensuring that virtual devices of only one context are active includes means, operative when one of the virtual devices transitions to the idle state, for deallocating and unlocking the corresponding physical video processing device.

4. A video device manager for managing access to physical video processing devices on a computer by an application program executed on the computer, comprising:

means for defining, for an application program, one or more virtual devices for allowing the application program to access one of the physical video processing devices, wherein each virtual device has a corresponding set of memory locations associated therewith;

means, associated with a virtual device, for receiving an indication of a memory location and for comparing the received memory location with the memory locations associated with the virtual device;

means for using the data stored in the received memory location from the received memory location when the memory location is accessible by the physical video processing device associated with the virtual device; and means for copying data from the received memory location to the memory locations associated with the virtual device when the memory location is not accessible by the physical video processing device associated with the virtual device.

5. The video device manager of claim 4, further comprising:

means for defining a context for each of the physical video processing devices;

wherein the means for defining virtual devices defines each virtual device as a state machine having an idle state and one or more active states; and means for ensuring that only one virtual device is active in each context.

6. The video device manager of claim 5, wherein the means for ensuring comprises means, when one of the virtual devices transitions from the idle state to an active state, for allocating and locking the corresponding physical video processing device to the virtual device.

7. The video device manager of claim 5, wherein the means for ensuring comprises means, when one of the virtual devices transitions to the idle state, for deallocating and unlocking the corresponding physical video processing device.

* * * * *